Figure 2:

April 9, 1957 G. B. PEDROCCHI 2,788,061
SPONGE RUBBER UPHOLSTERY
Filed Oct. 29, 1951

INVENTOR
GIOVAN BATTISTA PEDROCCHI,

BY *Stone, Boyden & Mack.*
ATTORNEYS.

United States Patent Office 2,788,061
Patented Apr. 9, 1957

2,788,061

SPONGE RUBBER UPHOLSTERY

Giovan Battista Pedrocchi, Milan, Italy, assignor, by mesne assignments, to Pirelli Sapsa Società per Azioni, Milan, Italy Application October 29, 1951, Serial No. 253,588

Claims priority, application Italy November 11, 1950

4 Claims. (Cl. 155—179)

This invention pertains to sponge rubber upholsteries manufactured from natural or synthetic rubber or rubber latex, and more particularly has reference to improvements in such upholsteries to make them more comfortable in use.

It is well known that in sponge rubber articles, however manufactured, the normal porous structure of the sponge rubber does not extend to the surface of the article, but is overlaid at the surface by a thin, denser layer of rubber having very minute pores. The presence of this denser surface layer of rubber of minute porosity precludes the free circulation of air from the interior of the upholstery to the outside, and vice versa. Such circulation of air is highly desirable, in order to rapidly dissipate the heat transmitted from the user's body in contact with the surface of the upholstery. Where such circulation of air is precluded by the denser surface layer of rubber, an uncomfortable feeling of warmth results. In addition to this inconvenience, heretofore attending the normal use of sponge rubber upholsteries, the dense surface layer of rubber also causes an unpleasant, gelatinous feeling to the user's body.

Since it is obviously impracticable to avoid the above mentioned inconveniences by removing the surface layer from sponge rubber upholsteries, after said layer has been formed as an organic part of the sponge rubber during the process of manufacture, it is a primary object of my invention to overcome the above disadvantages of prior art sponge rubber upholsteries without removing the surface layer, by a novel arrangement of the upholstery surfaces which contact the user's body whereby the free air permeability from the inside to the outside of such upholstery is markedly increased and a pleasant feeling is obtained in the use of the upholstery.

Another object of my invention is to increase the circulation of free air into and out of sponge rubber upholsteries by means of a novel process of manufacturing such upholsteries, wherein the formation of the usual denser surface layer of minute porosity is precluded, in certain portions of the surface of said upholsteries during the process of manufacture.

Another object of my invention is to provide a novel construction and arrangement of the surface of sponge rubber upholsteries, wherein the surface area exposed to the outside air is greatly increased while the area in actual contact with the user's body is notably reduced.

Still another object is to provide a novel construction and arrangement of the surface of sponge upholsteries which reduces the transmission of heat between the user's body and the upholstery, thereby reducing the feeling of cold or warmth which the user receives on first contact with the upholstery.

Figure 1:
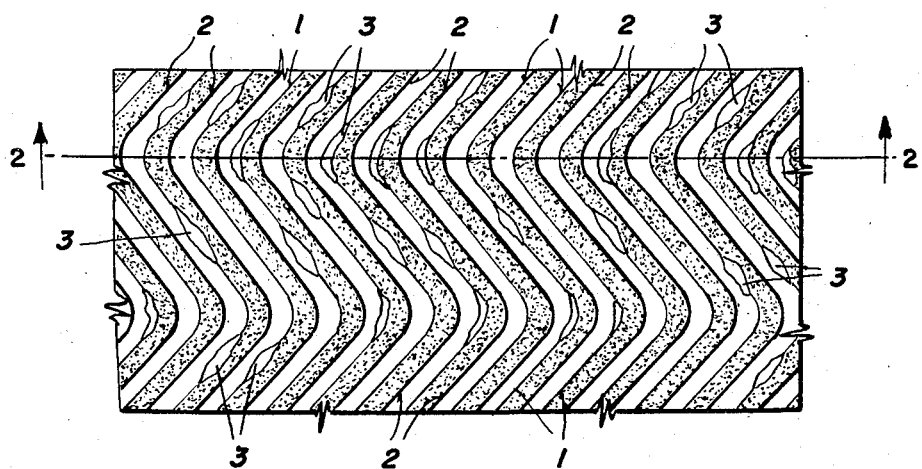

With these and other objects in view which may be incident to my improvements, my invention consists of the combination and arrangement of elements hereinafter described and illustrated in the accompanying drawing, in which:

Fig. 1 is a fragmentary plan view of a sponge rubber upholstery made in accordance with my invention; and Fig. 2 is a cross section along the line 2—2 of Fig. 1.

From Figs. 1 and 2, it will be noted that the upper surface of the sponge rubber which normally contacts the user's body, instead of being made perfectly smooth, as in the prior art, comprises a series of generally parallel ridges 1 and intervening grooves 2 which form spaced ribs, preferably of wedge-shaped cross-section, whose base width and height are of selected dimensions, as will be more particularly described hereinbelow. The sides of each rib may be equally or differently inclined (preferably the latter), and said ribs do not extend horizontally in straight lines across the surface of the upholstery, but are arranged in wave or curved line patterns, as shown in Fig. 1.

By virtue of the presence of these ribs, the area of the upper surface of the upholstery exposed to the air is greatly increased, thus facilitating the dissipation of heat from the upholstery and increasing its permeability to the outside air. At the same time, since only the upper edge portions of the ribs actually contact the user's body, because of the resistance of the ribs to deformation under the weight of the body, the area in contact with the user's body is markedly decreased, with corresponding decrease in the transmission of heat from the user's body to the upholstery and vice versa.

Furthermore, some portions of the grooves between the deformed ribs and the user's body imprison a stratum of air which acts as an insulation against the flow of heat from the user's body into the underlying upholstery or vice versa. These three actions of the ribs combine to markedly reduce the feeling of warmth or cold which the user receives on first contact with the upholstery.

The absolute and relative height and base width of the ribs is critical for the following reasons. The height of the rib must be such that the rib will not be completely flattened under normal body load, since such a deformation of the ribs would cause the elimination of the intervening grooves and heat insulating air stratum. I have found that the rib height must be about one-half centimeter, in order to properly resist excessive flattening under normal body load. At the same time, the height of the rib must not appreciably exceed one-half centimeter, since a greater height alters the thickness of the upholstery surface in such a way as to reduce resistance of the layer to proper deformation under normal body load. Likewise, for comfortable conformity to the user's body, the base width of the rib should exceed the rib height and must also be such size as to avoid undue bending of the ribs under body load.

In order to further increase the permeability to the circulation of air from the interior of the upholstery to the outside, and vice versa, the upper edges of the ribs do not form continuous ridges in their whole length, but are provided with irregular chamfered areas, as indicated by the reference numeral 3 in Figs. 1 and 2. These chamfered areas are portions of the surface where the denser surface layer of rubber (always present in prior art sponge rubber upholstery) is precluded from forming in the process of manufacture, as further described hereinbelow, so that the porous structure of the sponge rubber mass is laid bare in these areas. This greatly increases the air permeability from the outside to the inside of the upholstery, and vice versa, as compared with the normal smooth surface of prior art sponge rubber upholsteries.

The ribs 1 are obtained during the process of molding the sponge rubber upholsteries by the use of a suitable negative shape in the corresponding inner surface of the mold. The formation of the chamfered, denuded areas in the surface layer results from the fact that, in the distribution of the sponge rubber compound in the whole mold chamber occlusions of air occur between the grooves of the mold and the rubber compound which prevents said compound from flowing into the spaces occupied by these air bubbles. The frequency of these air occlusions, of course, depends upon the rapidity with which the sponge rubber compound is distributed throughout the whole mold chamber. By reason of these air occlusions, the rubber compound is prevented from coming in direct contact with the metal mold surface during vulcanization and hence the dense surface layer of rubber of minute porosity is not formed, as in the molding of prior art sponge rubber upholsteries. The porous structure of the vulcanized sponge rubber is thus left bare at the surface of the upholstery in the chamfered areas.

Except for the critical dimensions of the rib height and base width mentioned hereinabove, it will be understood that the design of the ribs shown in the drawing is given only as an example, by way of illustrating and any suitable design that will fulfill the purpose can be used.

While I have shown and described the preferred embodiment of my invention, I desire it to be understood that I do not limit my invention to the precise details shown by way of illustration, as these may be changed and modified by those skilled in the art without departing from the spirit of my invention or exceeding the scope of the appended claims.

I claim:

1. A process of molding articles of sponge rubber upholstery comprising a block of sponge rubber having a surface composed of ribs arranged in a selected pattern, said process being characterized by pouring liquid latex into a mold having grooves in a molding surface, at such a selected rapid rate that during said pouring, air bubbles are entrapped in said grooves and thus prevent said latex from contacting said molding surfaces in areas covered by said bubbles, thereby precluding the formation in said areas of a denser surface of more minute porosity in the molded surface of said article, during subsequent vulcanization of said article.

2. Sponge rubber upholstery having formed in its upper surface a plurality of closely spaced, substantially parallel, rubber ribs arranged in a selected pattern and so dimensioned that said ribs are only partially flattened by contact with a supported human body of selected weight range, whereby air is entrapped in portions of the grooves between said ribs coinciding with the area of said contact and forms a heat insulating stratum between said surface and said body; said ribs having portions of their peak edges chamfered, with a surface porosity the same as that of the mass of sponge rubber forming the upholstery; whereby free air permeability of the upholstery from its inside to the outside is markedly increased and the dissipation of heat in the upholstery from the supported body is correspondingly increased.

3. A seat cushion comprising a solid block of sponge rubber having flat, continuous bottom and side surfaces, and a top surface formed into a plurality of substantially parallel ribs and grooves of substantially triangular cross-section, said ribs being arranged in a zig-zag pattern and so dimensioned as to be only partially flattened in an area of contact with a supported human body of selected weight range the flattened portions of adjacent ribs by lateral expansion contacting each other to form with the contacting surface of said supported body pockets in portions of intervening grooves whereby air is entrapped in said pockets to form a heat-insulating stratum between said top surface and said body; said ribs having bevelled portions whose surfaces consist of sponge rubber of the same density and porosity as the sponge rubber composing said block; whereby the escape of heat from said block is facilitated.

4. An upholstery seat cushion comprising a molded block of sponge rubber having a top surface formed into a plurality of substantially parallel ribs and grooves; said ribs being so dimensioned as to be only partially flattened in contact with a supported human body of selected weight range, whereby the unflattened portions of said ribs form open channels for the circulation of air between said top surface and the surface of said body; said ribs having bevelled portions whose surfaces consist of sponge rubber of the same density and porosity as the sponge rubber composing said block; said porous surfaces and said channels providing means for the passage of air from the interior of said block to the outside thereof, whereby the escape of heat from said block is facilitated.

References Cited in the file of this patent

UNITED STATES PATENTS

| | | |
|---|---|---|
| 752,147 | Derick | Feb. 16, 1904 |
| 1,425,830 | Bell | Aug. 15, 1922 |
| 1,534,214 | Holt | Apr. 21, 1925 |
| 1,551,452 | Arias | Aug. 25, 1925 |
| 2,082,151 | De Poix | June 1, 1937 |
| 2,159,520 | Chapman | May 23, 1939 |
| 2,194,364 | Minor | Mar. 19, 1940 |

FOREIGN PATENTS

| | | |
|---|---|---|
| 434,550 | Great Britain | Sept. 4, 1935 |
| 481,234 | Great Britain | Mar. 8, 1938 |